INVENTOR
DANIEL SCHIFF
ATTORNEY

United States Patent Office 3,311,853
Patented Mar. 28, 1967

3,311,853
BROAD BAND CIRCULAR POLARIZER UTILIZING A PLATE OF PYROLYTIC BORON NITRIDE
Daniel Schiff, Framingham, Mass., assignor to Union Carbide Corporation, a corporation of New York
Filed Oct. 7, 1965, Ser. No. 493,709
1 Claim. (Cl. 333—21)

The present invention relates to broad band microwave polarizers. More particularly, the present invention is directed to the use of pyrolytic boron nitride in the construction of a broad band circular polarizer or quarter wave plate for microwave frequencies.

Pyrolytic boron nitride, which is described in U.S. Patent 3,152,006 is a new structural material which is characterized by excellent high temperature strengths and thermal shock resistance, and chemical inertness. Also, pyrolytic boron nitride has been found to have excellent microwave and infrared transmission properties.

Accordingly, in view of the foregoing properties it would be of considerable industrial benefit if pyrolytic boron nitride could be utilized in the construction of devices useful in microwave circuitry.

It is therefore an object of the present invention to provide a broad band microwave polarizer formed of pyrolytic boron nitride.

Figure 2:
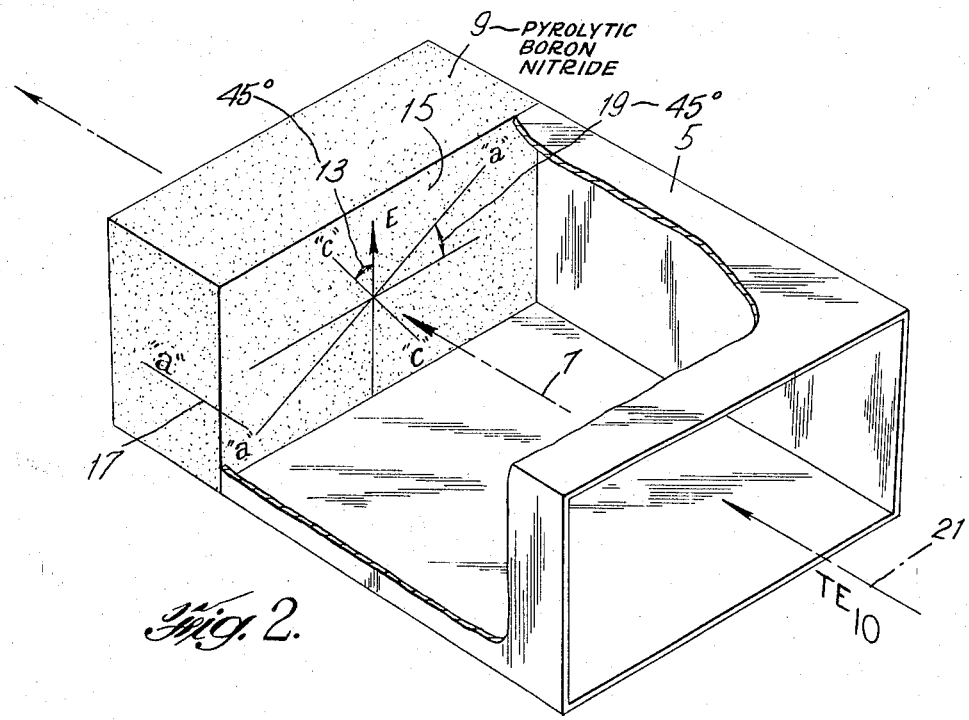
Figure 1:
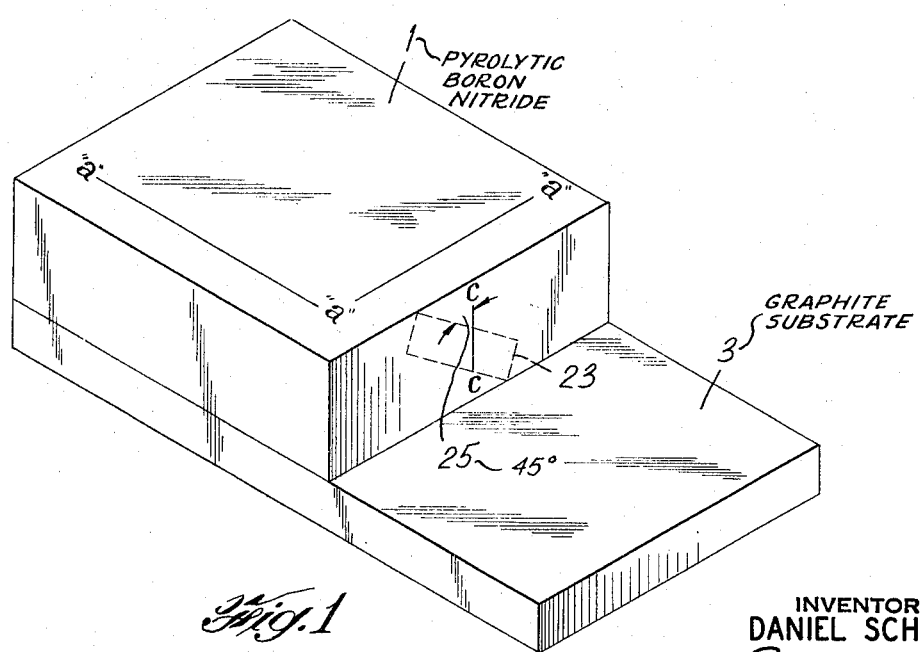

Other objects will be apparent from the description and claim taken in conjunction with the drawing in which FIGURE 1 shows a plate of pyrolytic boron nitride on a graphite substrate upon which it has been deposited and FIGURE 2 shows a microwave circular polarizer employing pyrolytic boron nitride in accordance with the present invention.

In accordance with the present invention there is provided, in combination, a rectangular wave guide having a predetermined E-field direction and a plate of pyrolytic boron nitride adjacent thereto arranged such that the $c$ direction of the pyrolytic boron nitride plate is normal to the wave guide axis and at an angle of 45 degrees to the predetermined E-field direction and such that the $a$ plane direction of the pyrolytic boron nitride plate is at an angle of 45 degrees to the predetermined E-field direction, the longitudinal axis of the wave guide being parallel to the $a$ plane direction.

In the present invention, pyrolytic graphite material is provided in the form of a plate. This can be done following the procedure disclosed in U.S. Patent 3,152,006. For example, boron trichloride and ammonia are reacted in the vapor phase in accordance with the following:

$$BCl_3 + NH_3 \rightarrow BN + 3HCl$$

The reaction is suitably carried out in a reaction chamber at a temperature of 3450° F. and a pressure of about 1 mm. Hg and the reaction chamber contains a graphite substrate upon which boron nitride is deposited.

FIGURE 1 illustrates a deposit of pyrolytic boron nitride at 1 and a graphite substrate at 3, indicating the form in which pyrolytic boron nitride is produced. The pyrolytic boron nitride can be conveniently produced in thicknesses up to one inch or more and can be readily machined to a desired shape or thickness.

A characteristic of pyrolytic boron nitride is that it is polycrystalline hexagonal boron nitride with a very high crystallite orientation, on the order of 1000:1. When referring to pyrolytic boron nitride material, $c$ and $a$ directions are used for purposes of definition. The $c$ direction is normal to the hexagonal layer planes and consequently is always normal to the substrate or deposition surface as indicated in FIGURE 1. The $a$ direction is the basal plane and is always parallel to the deposition surface also as indicated at FIGURE 1. The direction of the hexagonal layer planes, in pyrolytic boron nitride, and hence the $c$ and $a$ directions can also be determined by standard X-ray analysis techniques.

Referring now to FIGURE 2, this figure indicates at 5 a rectangular wave guide having a longitudinal axis shown at 7. The wave guide 5 is a hollow metal tube and, as is well known to the art, is used to direct or guide energy at microwave frequencies from one point to another. In the present invention, a plate of pyrolytic boron nitride indicated at 9 is arranged adjacent the wave guide 5 so that the $c$ direction of the pyrolytic boron nitride plate is normal to the wave guide axis 7. Also, as shown in FIGURE 2, the pyrolytic boron nitride plate is arranged so that the $c$ direction, as indicated at 13 is at an angle of 45 degrees to the predetermined direction of the E-field 15. Additionally, the pyrolytic boron nitride plate is oriented such that the direction of $a$ plane 17 is at an angle of 45 degrees to the predetermined E-field direction as shown at 19 and is parallel to the longitudinal axis 7 of the wave guide, i.e. parallel to the Poynting vector 21 of the plane polarized wave conventionally designated as $TE_{10}$. The microwave energy represented by $TE_{10}$ can be introduced into the wave guide by any of the conventional methods e.g. a probe or antenna and the E-field and magnetic field (not shown) can be provided by the usual techniques known to the art. The pyrolytic boron nitride plate, having the orientation previously described can be readily provided from as produced material. By way of illustration, the dotted lines shown at 23 in FIGURE 1 represents a section that would have the desired orientation, the angle 25 being 45 degrees.

By arranging a pyrolytic boron nitride plate as aforedescribed, and by providing a particular plate thickness, the plane polarized wave $TE_{10}$ can be converted to a circular polarized wave. For example, with a plate thickness of 0.49 inch and a plane polarized wave at $TE_{10}$ at a central frequency of 14.4 kmc. circular polarization is obtained with only 5% "off round" at 12 kmc. and 18 kmc. (18° on either side of 90°). This provides substantially circular polarization over a bandwidth of 50%. Similar results are obtained with a thickness of 0.587 inch for 12 kmc. and 0.392 inch for 18 kmc. As these values show, the thickness of the plate is directly proportional to the frequency.

The ability of pyrolytic boron nitride to function as a microwave circular polarizer is due to its crystal structure and its resultant dielectric anisotropy. The dielectric constant in the $c$ direction is 3.40 and in the $a$ plane its is 5.12.

From the foregoing description, it can be seen that an effective broad band microwave circular polarizer, suitable for use under severe environments, is obtained by employing pyrolytic boron nitride.

What is claimed is:

In combination, a rectangular wave guide having a predetermined E-field direction and an input end and an output end, a plate of pyrolytic boron nitride substantially closing the output end thereof and arranged such that the $c$ direction of the pyrolytic boron nitride plate is normal to the wave guide longitudinal axis and at an angle of 45 degrees to the predetermined E-field direction and such that the $a$ plane direction of the pyrolytic boron nitride plate is at an angle of 45 degrees to the predetermined E-field direction, the longitudinal axis of the wave guide being parallel to the $a$ plane direction.

No references cited.

H. K. SAALBACH, Primary Examiner.

P. L. GENSLER, Assistant Examiner.